US006382741B1

(12) United States Patent
McCann et al.

(10) Patent No.: US 6,382,741 B1
(45) Date of Patent: May 7, 2002

(54) PARKING-BRAKING IN VEHICLES (75) Inventors: Denis John McCann; Andrew John Ward, both of South Wales (GB)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/425,819

(22) Filed: Oct. 22, 1999

(30) Foreign Application Priority Data

Oct. 24, 1998 (GB) ............................................. 9823203

(51) Int. Cl.$^7$ .............................. B60T 8/18; B60T 8/24
(52) U.S. Cl. ....................................... 303/191; 188/265
(58) Field of Search ................................ 188/156, 265; 303/15, 22.2, 191, 198, 192, 155

(56) References Cited

U.S. PATENT DOCUMENTS

| 2,235,412 | A | | 3/1941 | Weiss |
| 3,684,049 | A | | 8/1972 | Kimura |
| 3,887,040 | A | | 6/1975 | Simon |
| 4,175,646 | A | | 11/1979 | Eikelberger |
| 4,400,039 | A | | 8/1983 | Ogata |
| 4,677,420 | A | | 6/1987 | Topic |
| 4,685,540 | A | | 8/1987 | Rath |
| 4,804,073 | A | | 2/1989 | Taig |
| 4,809,824 | A | | 3/1989 | Fargier |
| 4,850,459 | A | | 7/1989 | Johannesen |
| 4,995,483 | A | | 2/1991 | Moseley |
| 5,050,938 | A | * | 9/1991 | Brearley ........................ 303/7 |
| 5,127,495 | A | | 7/1992 | Verner |
| 5,148,894 | A | | 9/1992 | Eddy |
| 5,158,160 | A | | 10/1992 | Doell |

(List continued on next page.)

FOREIGN PATENT DOCUMENTS

| DE | 4327759 C2 | 7/1996 |
| DE | 19620344 | 8/1997 |
| DE | 19705105 A1 | 8/1997 |
| DE | 19653541 A1 | 6/1998 |
| DE | 19738877 A1 | 9/1998 |
| EP | 0789156 A1 | 8/1997 |
| EP | 0995657 A2 | 4/2000 |
| EP | 0995659 A1 | 4/2000 |
| EP | 0995922 A2 | 4/2000 |
| EP | 0995923 A2 | 4/2000 |
| JP | 59086723 | * 5/1984 |
| JP | 59145659 | * 8/1984 |
| JP | 4108058 | 4/1992 |
| JP | 7257356 | 10/1995 |
| JP | 7277157 | 10/1995 |
| JP | 9221010 | 8/1997 |
| JP | 10024813 | 1/1998 |
| WO | WO97/29292 A2 | 8/1997 |
| WO | WO97/29297 A1 | 8/1997 |
| WO | WO97/29298 A1 | 8/1997 |
| WO | WO99/38738 A1 | 8/1999 |
| WO | WO99/48738 A1 | 9/1999 |

*Primary Examiner*—J. J. Swann
*Assistant Examiner*—David Divine
(74) *Attorney, Agent, or Firm*—Carlson, Gaskey & Olds (57) ABSTRACT

A parking braking system for a brake in a vehicle wherein, upon moving a parking brake selector to a park position, the brake is arranged to be mechanically locked or latched into place by means of a variable position park latch mechanism which is adapted to co-operate with an operating member of the brake so as to set the park load on the brake at a desired level. The parking braking system includes a control system which has a brake level determining means (134) to determine the brake load level at which the brake is to be parked and a control means (136) for controlling the actuation of the latching mechanism, or a combination of several latching mechanisms, to selectively maintain that brake load level during a parking phase. In order to determine the park load level to which the brake should be applied in a given situation, there is provided a static mode 1 which generates a signal representative of the static condition of the vehicle or a static compensation signal.

4 Claims, 10 Drawing Sheets

U.S. PATENT DOCUMENTS

| | | |
|---|---|---|
| 5,161,650 A | 11/1992 | Taig |
| 5,310,251 A | 5/1994 | Towers |
| 5,348,123 A | 9/1994 | Takahashi |
| 5,370,449 A | 12/1994 | Edelen |
| 5,410,293 A | 4/1995 | Angerfors |
| 5,775,448 A * | 7/1998 | Hirahara .................. 180/24.02 |
| 5,788,023 A | 8/1998 | Schoner |
| 5,807,205 A * | 9/1998 | Odaka ......................... 477/29 |
| 5,848,672 A | 12/1998 | Brearley |
| 5,949,168 A | 9/1999 | Dieckmann |
| 5,954,162 A | 9/1999 | Feigel |
| 5,957,246 A | 9/1999 | Suzuki |
| 5,975,250 A | 11/1999 | Brandmeier |
| 5,988,773 A | 11/1999 | Sawada |
| 6,000,507 A | 12/1999 | Bohm |
| 6,003,640 A | 12/1999 | Ralea |
| 6,012,556 A | 1/2000 | Blosch |
| 6,016,694 A * | 1/2000 | Decker ......................... 73/121 |
| 6,044,934 A * | 4/2000 | Nemeth ........................ 188/67 |
| 6,120,109 A * | 9/2000 | Wood et al. ................ 303/22.6 |
| 6,129,183 A | 10/2000 | Ward |
| 6,131,450 A * | 10/2000 | Decker et al. ................ 73/121 |
| 6,139,117 A * | 10/2000 | Shirai ............................ 303/3 |
| 6,161,657 A * | 12/2000 | Zhuang et al. ................ 188/67 |
| 6,179,092 B1 * | 1/2001 | Naaktgeboren et al. ....... 188/31 |
| 6,209,689 B1 * | 4/2001 | Bohm ........................ 188/156 |
| 6,223,865 B1 * | 5/2001 | Lang et al. ............. 188/73.31 |

* cited by examiner

OPTION B :- 'V' SHAPED OP-SHAFT

ORIGINAL     MODIFIED

FIG.20.

PARKING-BRAKING IN VEHICLES

The present invention relates to parking braking systems for vehicles having either conventional or electronically controlled braking systems.

The accepted approach to parking brakes in vehicles fitted with traditional pneumatic braking systems is to have a connection, either pneumatically, hydraulically or by cable, between a manually operated actuating device, such as a lever or valve, and some form of braking device at the individual wheels. In heavy vehicles having pneumatically operated brakes, for example, this usually involves releasing the air supply to brake actuators at the wheels to enable the brakes to be applied by strong springs whose force is normally opposed by the air supply in non parking braking modes.

Figure 1:
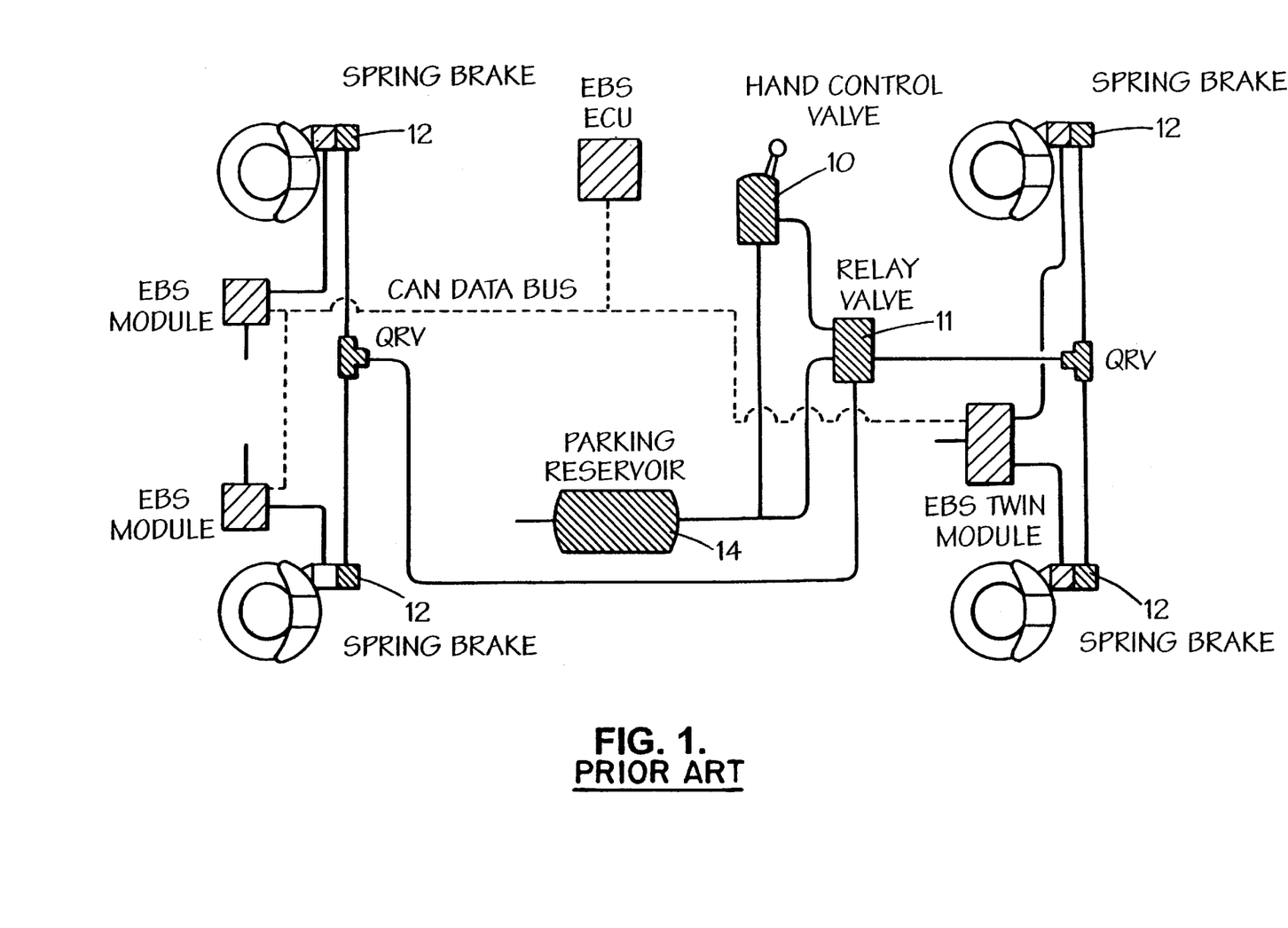
FIG. 1 is a diagrammatic illustration of an example of a conventional parking brake system in an EBS system

This accepted approach to parking brakes in vehicles fitted with EBS uses spring brake actuators as shown diagrammatically in FIG. 1 of the accompanying drawings. In this system, a hand-operated valve 10 is used, via a relay valve 11, to allow the parking brake to be applied. The valve 10 operates on an inverse air principle in that it is arranged to release air pressure to allow the spring force of respective spring brake actuators 12 at each wheel to be applied. A suitable parking brake reservoir 14 is required to store the pressurised air for use within the system. Where the system is used with a vehicle having a trailer, a separate relay valve (not shown) is required to allow selective operation of the trailer brakes. When the drive operates the hand valve 10, an inverse pneumatic signal is produced, i.e., the pressure output from the valve 10 falls with increasing demand. This causes the spring brakes 12 to be applied since, in the normal running mode (no braking) the springs are held off by compressed air.

As evident from FIG. 1, the layout and construction of the conventional parking brake system requires the use of bulky spring actuators, a parking reservoir and associated pipework. All of these components require fitting and service which all adds to labour and material costs at the vehicle builders. Similar bulky spring actuators are usually also used in conventional pneumatic/mechanical (non-EBS) systems.

We have proposed in another Application filed concurrently hereto the provision of a parking braking system for a brake in a vehicle wherein, upon moving a parking brake selector to a park position, the brake is arranged to be mechanically locked or latched into place by means of a variable position park latch mechanism which is adapted to co-operate with an operating member of the brake so as to set the park load on the brake at a desired level.

In some embodiments, the variable position park latch mechanism can comprise a variable position backstop that is positioned so as to selectively abut the operating or input shaft of the brake.

The variable position backstop can be, for example, a cam or ratchet pin but is preferably a wedge, driven into position by a controlled actuator such as an air cylinder or preferably a motor.

An advantage of being able to park the brake at any prescribed level is the ability to accommodate changes in both the brake geometry and vehicle static condition. In particular, it is known that as a brake cools, during the time that a vehicle may be parked after a journey, the brake geometry changes, and can change in such a way that if a fixed park load condition was implemented, the clamp force being applied could reduce as the brake geometry relaxes. This would usually force the designer of a fixed park load system to over-clamp the brake to avoid the brake from being substantially released during cooling. This obviously induces greater stress and fatigue into the brake, both of which have to be accommodated in the brake design, thus producing a brake which is substantially over-engineered for the application. Furthermore, if it is possible to determine either or all of the vehicle static condition parameters such as operating gradient, axle load or brake temperature, then the park clamp load can be made to adapt to the prevailing vehicle condition.

A further advantage of a variable park latch system is that the build-up of basic brake condition tolerances, such as brake running clearance, new or worn linings and compressibility of the linings, again means that a single park load system, that clamps the brake at a fixed position, cannot take account of the variance in the aforementioned components without oversetting the clamp load.

Systems as described above can seek to overcome this problem by determining the level at which the park brake should be latched, driving the brake to a prescribed level using the foundation actuation system and then locking the brake at a desired level.

In preferred embodiments, a wedge is driven into engagement with a corresponding mating surface provided in the back of the operating shaft of the brake, by a motor driven threaded member. The threaded member assembly preferably comprises a non-reversible mechanism such as a high reduction ratio gearbox.

Particularly with embodiments using a cam or wedge, such systems have the ability to enable adjustment of the park load level during the parked condition through the use of the variable latch mechanism.

In accordance with the present invention there is provided a control system having a brake level determining means to determine the brake load level at which the brake is to be parked and a control means for controlling the actuation of the latching mechanism, or a combination of several latching mechanisms, to selectively maintain that brake load level during a parking phase.

Preferably, in order to determine the park load level to which the brake should be applied in a given situation, there is provided a static model which generates a signal representative of the static condition of the vehicle or a static compensation signal.

Preferably, the static model is arranged to derive the static compensation signal through assessment of the stationary condition of the vehicle. Conveniently, this is derived by way of example, from measurements taken from around the vehicle. A brake temperature signal can provide a signal indicative of the brake temperature at the time of park demand. A gradient sensor likewise can provide a signal that is proportional to the gradient upon which the vehicle is being parked, and an axle load sensor can provide information about the laden condition of the vehicle.

Advantageously, depending upon the level of complexity required, any one or more of the above signals may use used alone or in combination to provide the vehicle information required. Additionally, such signals may be derived by association, i.e. not by direct measurement. In particular, the brake temperature may be derived through assessment of the change in brake actuator travel during brake application, as brake travel for a given pressure can change with temperature of the brake.

Conveniently, a clamp load requirement can be produced for a given correlation between axle load and gradient. Only a low, say 10% of the maximum available, clamp load is required at both low gradients with high axle load as well as high gradients with a low axle load, subject to a minimum safe threshold. Likewise, a high, say 100% of the maximum available, clamp load is required for a brake on a vehicle carrying a high axle load on a high gradient. The output from this "map", preferably takes the form of a series of look-up tables in a non-volatile memory within the park latch controller.

Advantageously, the clamp load derived from the correlation between axle load and operating gradient may also be adjusted to take account of the relaxation with the brake as it cools. The brake temperature at the commencement of park can be used to introduce a proportional offset to the derived clamp load. The modified value deduced from this comparison can produce the static compensation signal that is used for setting the level to which the brake is actuated prior to the park latch being applied.

As mentioned hereinbefore, the present system is not limited to uses with EBS systems but is equally applicable to conventional brake actuation systems fitted with parking signalling to the park latch system.

The invention is described further hereinafter, by way of example only, with reference to the accompanying drawings, in which.

The present invention is described further hereinafter principally in regard to EBS systems. However, it is emphasised that the invention is equally applicable to non EBS systems operated using traditional mechanical and pneumatic couplings between the driver-operated controls and the brakes.

Figure 2:
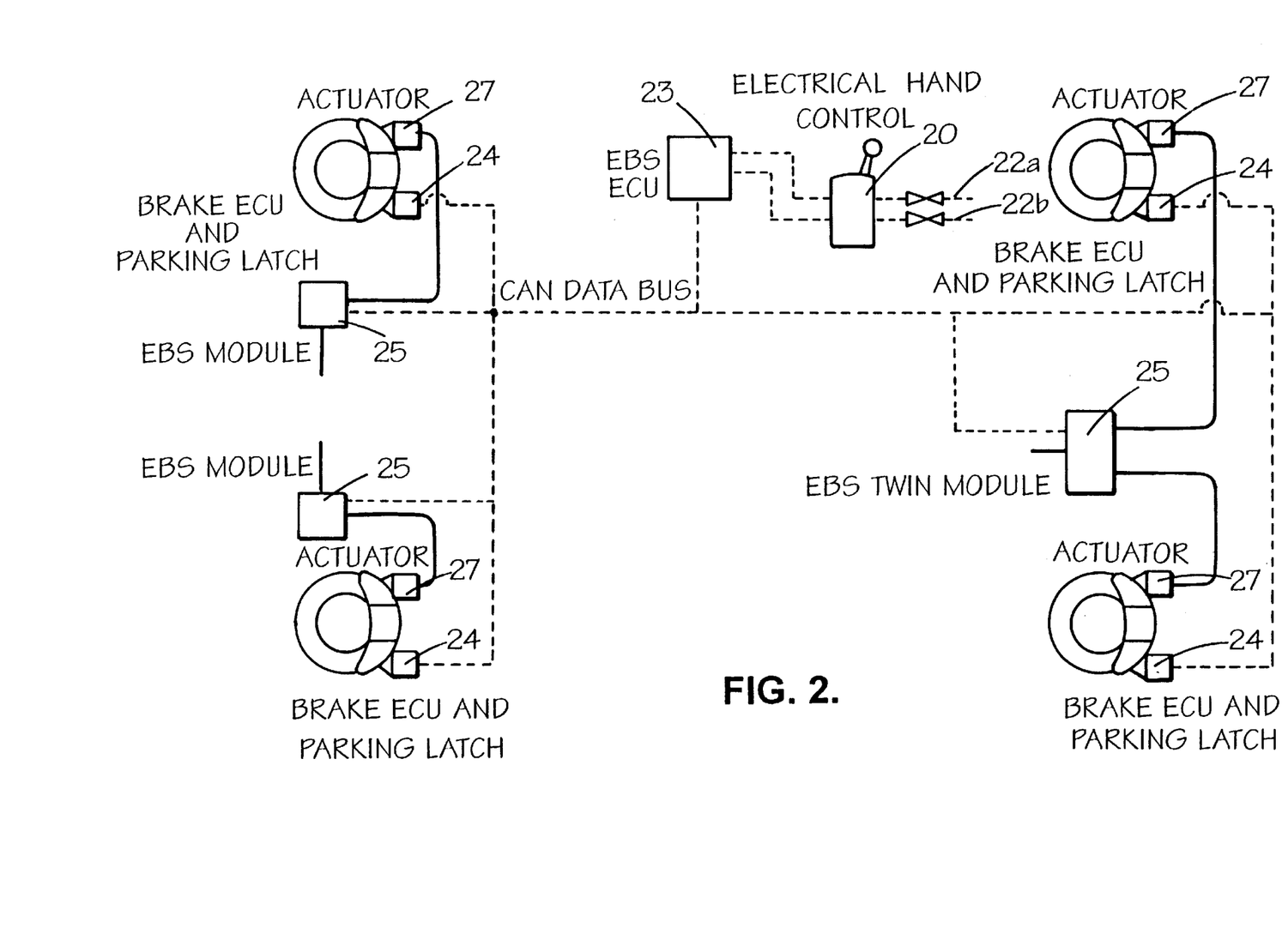
FIG. 2 is a diagrammatic illustration of an EBS system incorporating one embodiment of a parking brake system to which the present invention can be applied.

Referring now to FIG. 2, the illustrated system comprises a hand control 20 containing two demand sensors (not shown) which are preferably potentiometers, powered by individual fused lines 22a, 22b, fed from a single source (not shown) such as the vehicle battery. The use of potentiometers enables the parking braking to be modulated via the vehicle EBS 23, 25 and has a "park" position into which the hand lever is arranged to be latched. Individual power wires, sensors and signal wires are used to provide redundancy, should a bad connection or other fault develop in one of the channels.

Parking latching mechanisms 24 are installed in each of the wheel brakes. These mechanisms 24 are used to latch the brakes in a clamped condition when the hand control 20 is moved to the park position. In principle, the parking latching mechanisms 24 can be electrically or electro-pneumatically operated.

FIG. 2 shows schematically an EBS system applied to a vehicle having four braked wheels, two at the front and two at the rear. The forward wheels (on the left in FIG. 2) and rearward wheels (on the right) have brake actuators 27 which are selectively operated for normal braking by control signals generated electrically via a foot controlled transducer (not shown) and manipulated via the vehicle EBS. As indicated schematically in FIG. 2, the system also includes the parking brake latches 24 and local brake ECUs 25.

Figure 3:
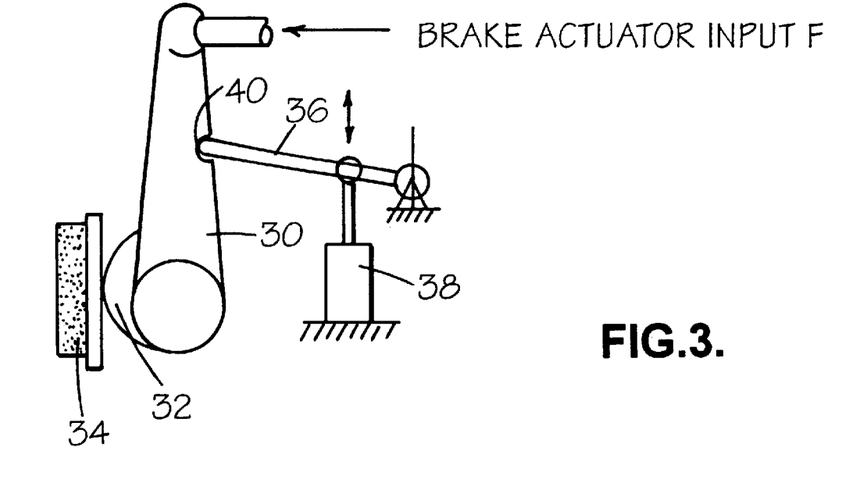
FIG. 3 is a diagrammatic illustration of a non-variable position park latch device.

FIG. 3 shows a basic system wherein a brake actuator input force F rotates a lever 30 carrying a cam 32 for urging a brake pad 34 against a brake disc for normal, non-parking braking purposes. In order to enable the brakes to be retained in a brakes-applied condition for parking braking, a pivotable latch pin 36 can be rotated by an actuator 38 so as to engage in a recess 40 in the lever 30. This provides a latch that can hold the brakes in a set position but cannot accommodate variations in the required park load.

Figure 4:
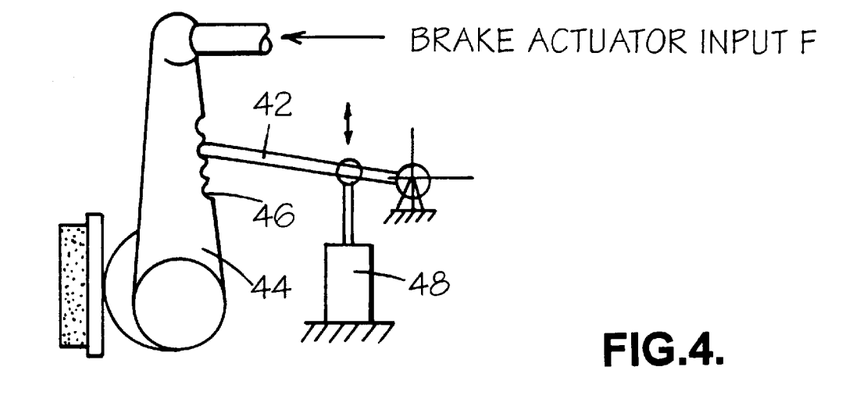
FIGS. 4 and 5 are diagrammatic illustrations of first and second variable position park latch devices.

FIG. 4 shows a development of the arrangement of FIG. 3 wherein a variable position park latch mechanism is provided. The device of FIG. 4 comprises a multi-point latch system that has the ability to set the park load at any one of a number of predetermined park load levels via multi-positional mechanical engagement of a solenoid or other linear actuator driven latch pin 42 driven into and out of engagement with an operating member 44 of a brake. For this purpose, the operating member 44 has a number of recesses 46, selectively engageable by the pivoted latch pin 42 whose angular position is determinable by an actuator 48.

In operation of the embodiment of FIG. 4, for example in the environment of an EBS system, in the event that park braking is demanded by operation of the hand control (FIG. 2) and the lever 44 has been rotated anti-clockwise as viewed in FIG. 4 to a brakes-fully-applied condition, the latch mechanism in the form of the pin 42 is arranged to be displaced anti-clockwise by the actuator 48 to bring the pin 42 into a position behind the lever 44 where it engages one of the recesses 46 to prevent the lever 44 from returning clockwise when the pneumatic actuator is exhausted. The parking brake is thereby held on until the hand control 20 is operated to release the parking brake, at which time the lever 44 is moved slightly anti-clockwise to a level at least and possibly slightly more than the load that was required to park the brake to release the contact pressure with the pin 42. The pin 42 is arranged to be displaced to enable normal foot braking to be resumed.

The brakes may also have multiple sensors and rapid running clearance take-up, so there would be an ECU installed, connected to the local EBS module over a data bus in an EBS equipped vehicle. This ECU would contain the drivers for the latching mechanism. If this ECU is not present, as would be the case with a brake having the addition of the parking feature only, it is possible to control the latch through direct wiring to the EBS module. In a conventional braking system, i.e. non-EBS, the park latch ECU would receive all sensor signals and control the operation of the foundation actuation system and the park latch drive.

Figure 5:
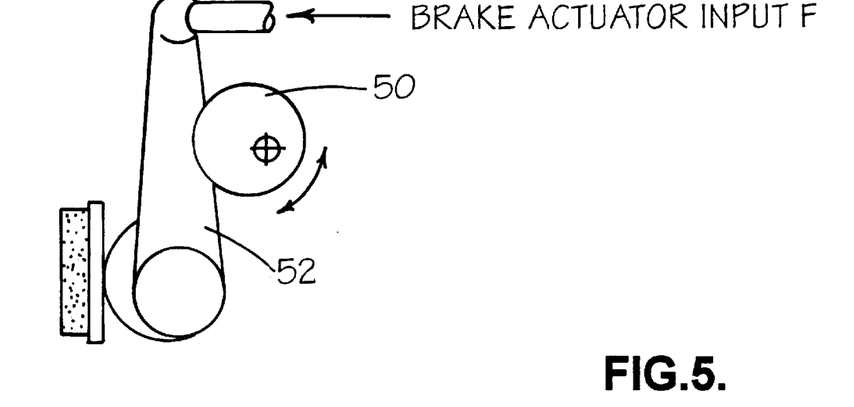

FIG. 5 shows a further improvement where the surface of a cam member 50 provides a variable backstop for the operating member 52 of the brake, the cam member 50 being driven rotationally by a motor and/or gearbox (not shown). The feature of being able to latch at a variable park load improves over the fixed levels of FIG. 4 but also has the further advantage of allowing further adjustment of the park load during the parked condition, by additional rotation of the cam in either direction, without having to disengage and reengage the brake mechanism.

Figure 6:
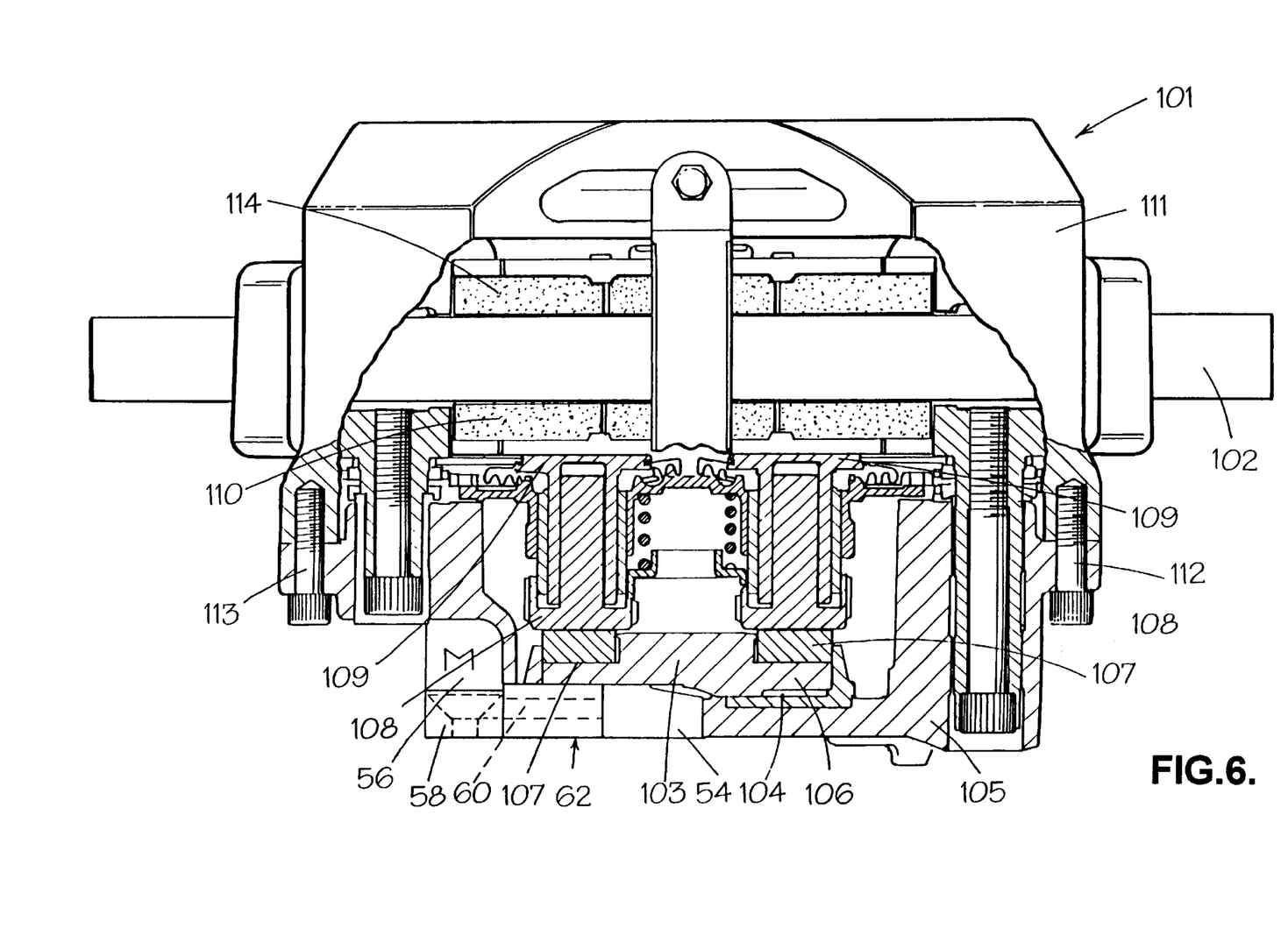
FIG. 6 is a sectional view through a braking device fitted with a variable latching device.

FIG. 6 shows a preferred implementation where the cam of FIG. 5 has been replaced by a wedge 54 which is positioned through use of an electric motor 56, driving through a reduction gearbox 58 onto a lead screw 60 of a linear driver 62 which moves the wedge 54 linearly into and out of the desired park position. The use of a reduction gearbox allows the further use of a low power motor having a compact layout suitable for mounting integrally with the brake. Additionally, the reduction gearbox and lead screw arrangement provide a non-reversible 'detent' which holds the wedge in position until further driven by the electric motor.

Figure 7:
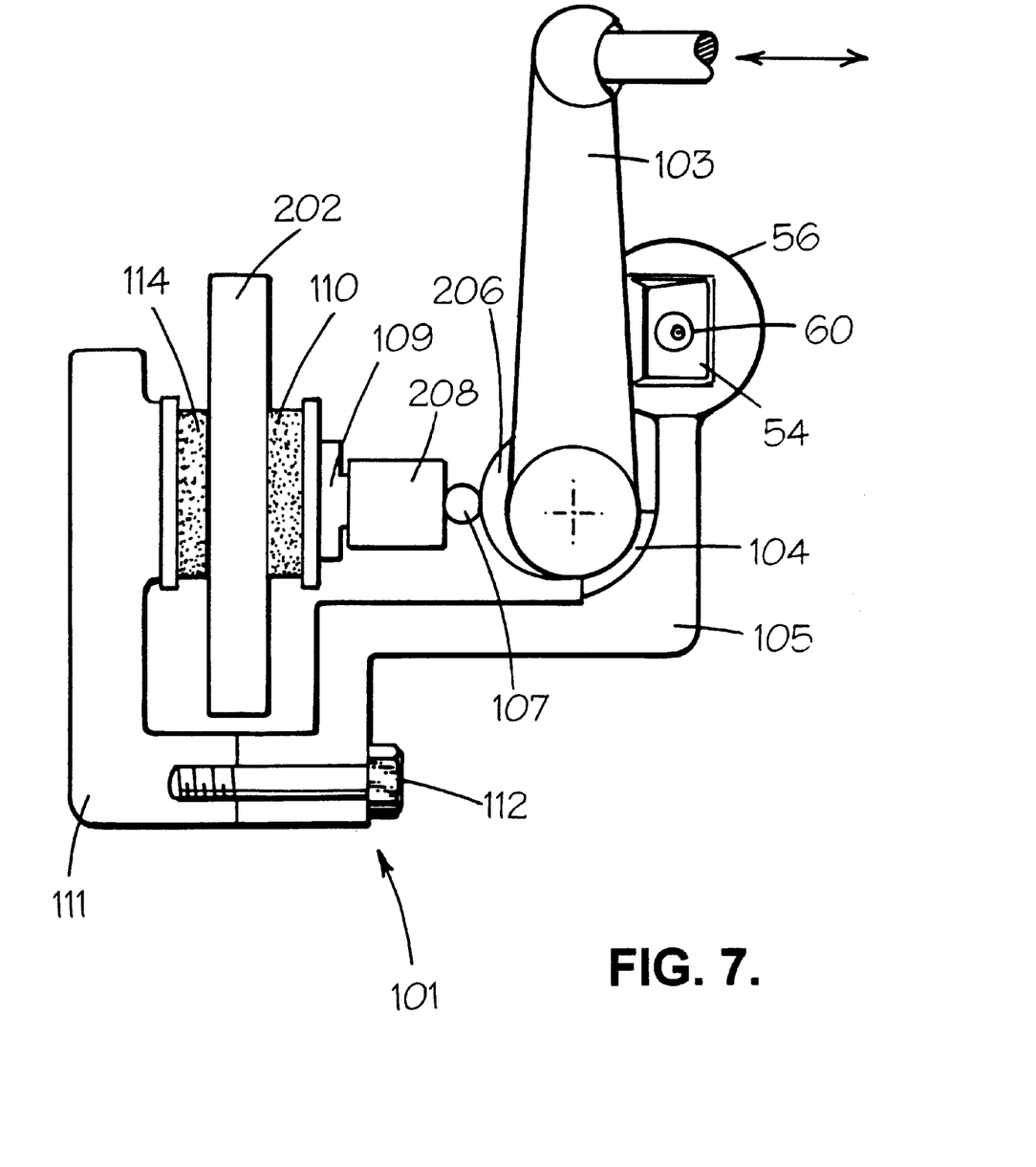
FIG. 7 illustrates the principle of operation of the latching device of FIG. 6.

FIG. 7 shows a simplified arrangement of the implementation shown in detail in FIG. 6 and having a motor-driven wedge 54.

Although not really necessary to an understanding of the present invention, there follows a brief explanation of the disc brake structure of FIG. 6 to which the motor driven wedge has been applied.

The disc brake of FIGS. 6 and 7 comprises a housing 101 that straddles a disc 102 mounted on an axle of the vehicle to be braked (not shown). The brake is actuated by mechanical movement of an input actuator such as an air cylinder (not shown). Such actuators are well known in the field of brake actuation. The actuator co-operates with the outer end of the operating shaft or 'op-shaft' 103 of the brake. The inner end of the op-shaft is carried in a bearing attached to the lower or inner housing part 105. Said inner end of the op-shaft 103 has formed on its outer surface a cam lobe 106 which upon rotation causes a reaction force to be transmitted to rollers 107. The rollers 107 in turn transmit the applied load to a pair of spaced inner tappet members 108. These inner tappet members 108, are screwed into engagement with associated outer tappet members 109 which apply the input load from the actuator to the rear of the inner braking lining 110, thus pressing the friction material of the inner braking lining 110 into frictional engagement, with the disc 102. A reaction force is generated through this frictional engagement between the disc 102 and inner braking lining 110, that is fed back through the tappets 108 and 109, rollers 107 and cam lobe 106 which is supported by the inner housing part 105. The inner housing part 105 is secured to the outer housing part 111 by bridging bolts 112 and 113. Thus the applied force being generated by movement of the op-shaft 103 is ultimately transmitted by reaction means to the outer housing part 111 which in turn presses the outer brake lining 114 into frictional engagement with the disc 102. Therefore it will be appreciated that the disc 102, upon movement of the op-shaft 103, is clamped between inner and outer friction linings 110 and 114 to generate a braking force for braking the vehicle under control of the applied input movement.

Figure 8:
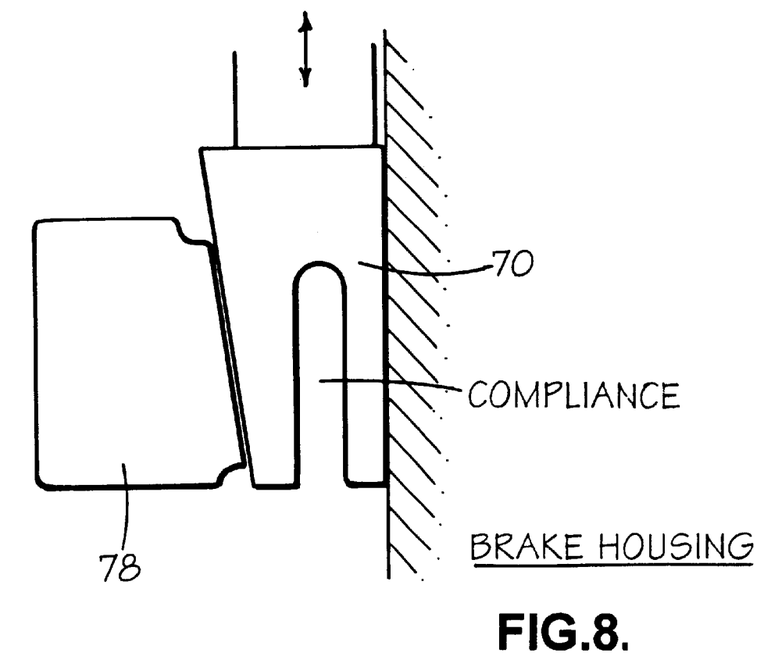
FIGS. 8 and 9 are diagrammatic illustrations of two further variable latching devices.
Figure 9:
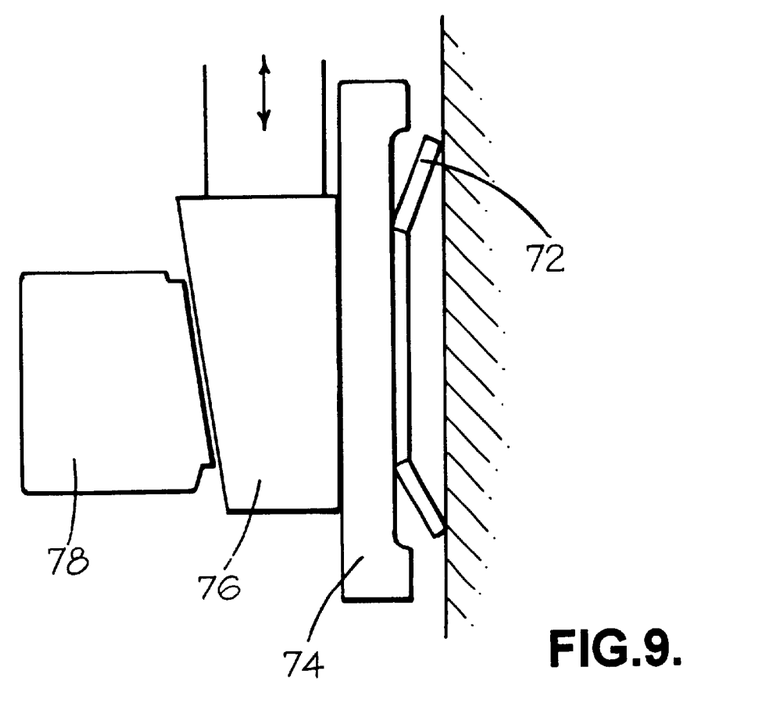

Reference is now made to FIGS. 8 and 9 which illustrate particular embodiments of the wedge version of the actuator wherein a means is included to enable an amount of mechanical compensation for dimensional changes within the brake during cooling. This is achieved by the inclusion of a stiff but compliant form within the wedge that is able to support the park load reaction from the op-shaft but which is capable of 'following' the op-shaft as the brake relaxes so as to substantially maintain the force applied thereto.

The compliance may be built into the wedge itself or may indeed be built into the support for the wedge. Conveniently, the wedge is as illustrated in FIG. 8 where the wedge 70 is substantially of a 'C' section in outline and formed in a material that, whilst compliant, is of relatively high stiffness. Thus, as the park latch is engaged, the op-shaft compresses the wedge until a stable condition is achieved. As the brake cools, the brake dimensions alter which cause the op-shaft to move substantially away from the wedge but the wedge is able to follow over at least a short operating range holding the clamp load at substantially the applied load condition.

In the embodiment of FIG. 9, the support surface for the wedge itself is formed from compliant means and has the same affect as in the embodiment of FIG. 8. In this case, the compliant means comprises a Belleville spring 72 which urges a support 74 against the wedge 76. The op-shaft is shown at 78.

To ensure that the integrity of the system is maintained, the parking function is preferably provided on at least two vehicle axles that are each controlled by discrete parts of the braking system, such as the front and rear circuits in a vertically split system.

When used in an EBS system, the hand control 20 works as a demand sensor, much the same as that installed in a conventional foot controlled valve. In practice, the logic would preferably be arranged such that whichever channel sets the high demand would win. When the control is moved to the park position, the brakes would be actuated by a high pressure, that is sufficient to provide the parking brake forces necessary to at least meet the requirements of the braking regulations. Once the latch is in place, the EBS releases the braking pressure.

There now follows a description of the system functions which firstly determine the level at which the brake is to be parked and secondly provide the means for actuating the or a combination of latching systems. The description assumes the use of a motor driven wedge latching arrangement as in FIG. 6.

Figure 10:
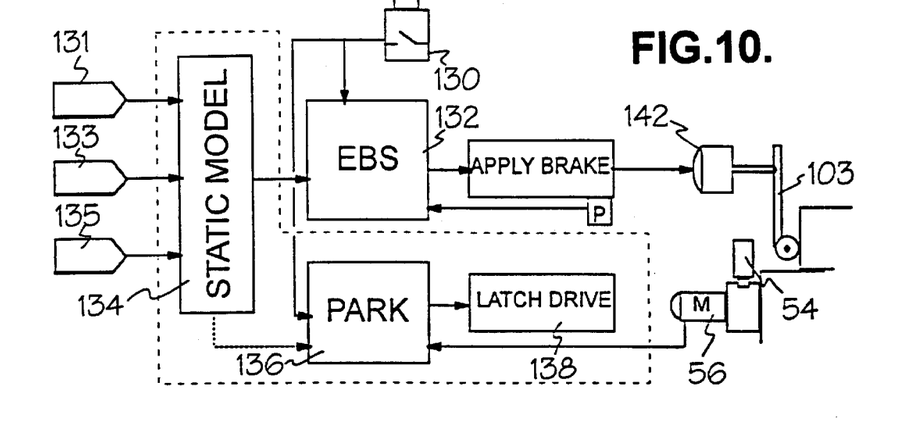
FIG. 10 is a block system diagram showing one way in accordance with the present invention by which, on a vehicle equipped with an EBS system, variable or compensated parking can be achieved.

Reference is made firstly to FIG. 10 in this connection. FIG. 10 is a block system diagram showing the means provided, on a vehicle equipped with an EBS system, for achieving variable or compensated park latching. The system includes an input device for providing an input signal indicative of a driver's parking demand. For convenience here, the input device takes the form of a two-state switch 130, which when actuated provides a binary signal for initiating the parking procedure. Alternatively, the switch may take the form of a proportional signal generator such as a potentiometer, that in use is able to progressively apply the brakes. The present system is concerned principally with the total or full park signal that is either generated by the two-state switch or by the full actuation of the proportional device.

The park signal is fed to, firstly, the EBS system ECU 132, whose purpose is to apply the brake which is to be parked. The level to which the brake is applied depends upon the static condition of the vehicle. A signal, representative of the static condition of the vehicle or static compensation signal, is generated by a static model 134, for use by the EBS system in setting the park pressure.

The static model 134 derives the static compensation signal through assessment of the stationary condition of the vehicle. Conveniently, this is derived by way of example, from sensor inputs from around the vehicle. A brake temperature signal 131 provides a signal indicative of the brake temperature at the time of park demand. A gradient sensor 133 likewise provides a signal that is proportional to the gradient upon which the vehicle is being parked, and an axle load sensor 135 provides information about the laden condition of the vehicle.

It should be understood that, depending upon tie level of complexity required, either one or more of the above signals may be used alone or in combination to provide the vehicle information required. Additionally, it should also be understood that such signals might be derived by association, i.e. not by direct measurement. In particular, the brake temperature may be derived through assessment of the change in brake actuator travel during normal braking, as brake travel for a given pressure can increase with temperature of the brake.

Figure 13:
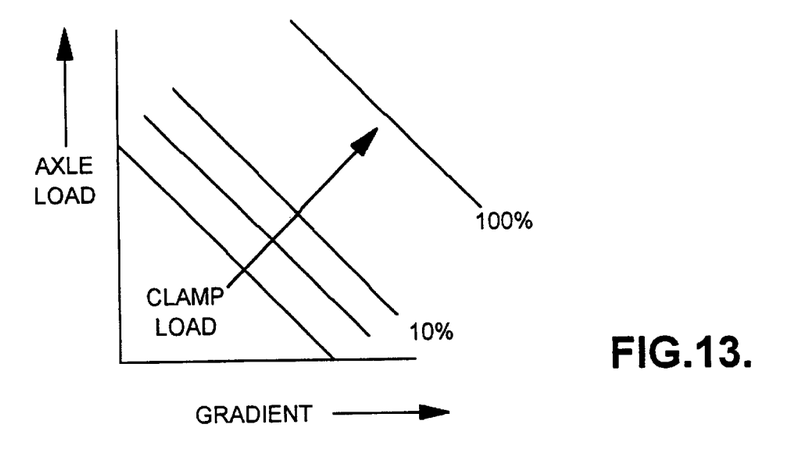
FIG. 13 shows the clamp loads for different ratios of axle load to operating gradient.

Conveniently, as shown in FIG. 13, a clamp load requirement can be produced for a given correlation between axle load and gradient. Only a low, say 10% of the maximum available, clamp load is required at both low gradients with high axle load as well as at high gradients with a low axle load, subject to a minimum safe threshold. Likewise, a high, say 100% of the maximum available, clamp load is required for a brake on a vehicle carrying a high axle load on a high gradient. The output from this 'map', would preferably take the form of a series of look-up tables in a non-volatile memory within the park latch controller.

Figure 14:
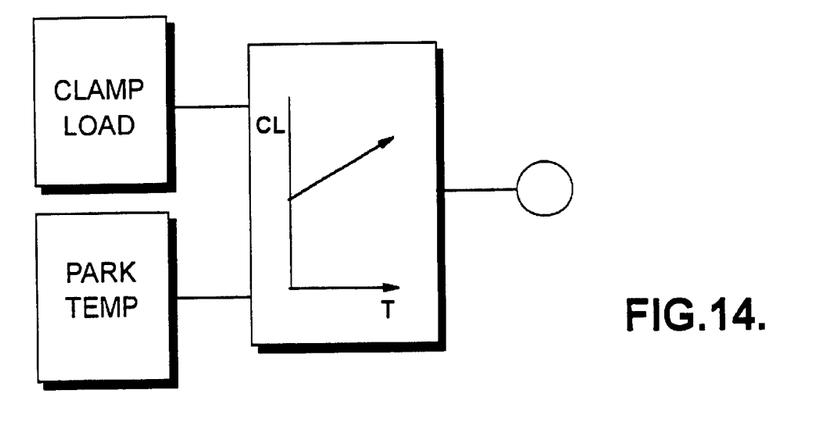
FIG. 14 shows how clamp load derived from the correlation between axle load and operating gradient may be optionally adjusted.

Referring now to FIG. 14, the clamp load derived from the correlation between axle load and operating gradient may also be optionally adjusted to take account of the relaxation within the brake as it cools. The brake temperature at the commencement of park is used to introduce a proportional offset to the derived clamp load $C_L$. The modified value deduced from this comparison produces the static compensation signal that is used, as in FIG. 10, by the EBS system for setting the level to which the brake is actuated prior to the park latch being applied.

Returning again to FIG. 10, the EBS system, upon receipt of a park demand signal, sets a brake application pressure in accordance with the static compensation signal. The level of braking is applied and maintained by the EBS system, using for example, actuator pressure feedback. The driver's parking demand signal is also fed to the park latch controller 136 to actuate the latch drive mechanism 138 causing the motor 56 associated with the brake to be parked to drive the wedge 154 into engagement with the op-shaft 103 of the brake which is now in an advanced, braking, position. Upon the coming together of the wedge and op-shaft, the motor stalls, which may be detected internally by the latch drive or may be derived through assessment of a motor position signal derived from an encoder fitted to the motor. Once this condition is detected, the park latch controller 136 issues a signal to the EBS controller 132 that is indicative of the end of the park operation. Upon receipt of this signal, the EBS system releases the operating pressure from the brake actuator 142.

Release of the driver's parking demand causes the EBS system to reactivate the brake actuator 142 to either some maximum value or, where the previously applied level can be stored in a non-volatile memory, to a level that is slightly higher than the level previously applied level. The park latch controller 138 then drives the wedge 54 in reverse so as to disengage the latch and return the wedge to its rest position.

Additionally, during the parked phase, it is possible to adjust the level of park load applied to the brake by reapplying the brake using the EBS system and latching to either a higher or lower level. Alternatively, as shown in the dotted connection, the static condition model information can be fed directly into the park latch and latch driver, which causes the wedge to be driven further into or out of engagement with the brake op-shaft 103. With this latter option, there would obviously be no need to generate further actuation force to modify the park load. Such an adjustment may be required in the event of a vehicle that was being loaded or unloaded on a gradient. It is appreciated that where an unladen vehicle is parked, the park load may be relatively low. Should that vehicle then be loaded, there would be a requirement to increase the parking load being applied. Such changes in the vehicle condition can be accommodated by either oversetting, by a safe margin, the original park load or by adaptive adjustment during parking.

Figure 11:
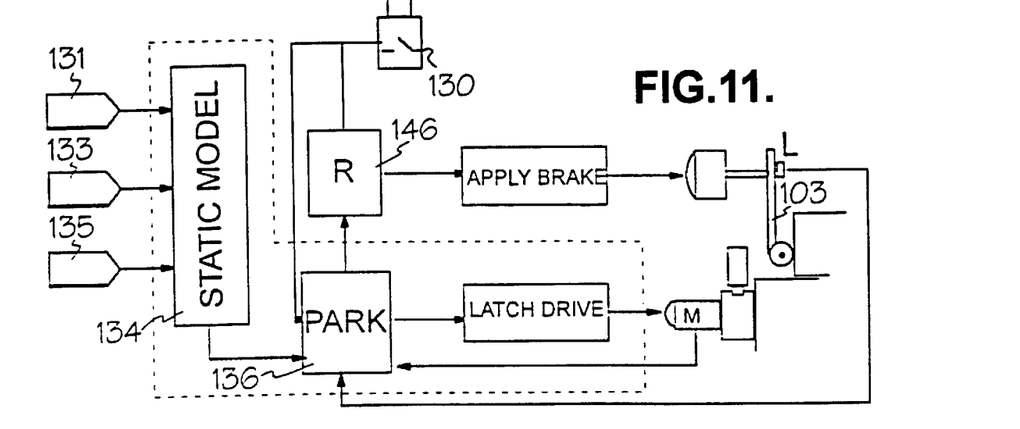
FIGS. 11 and 12 are block system diagrams, similar to FIG. 10 but for brake systems in a non-EBS equipped vehicle.
Figure 12:
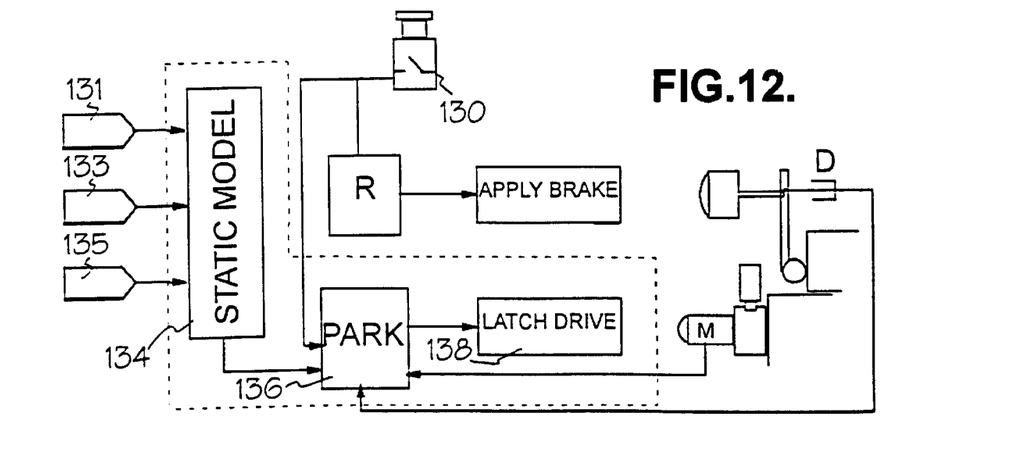

FIG. 11 shows an alternative implementation of the park latch system in a brake system that is conventionally actuated, i.e. a non-EBS-equipped vehicle. The basic functions of the system are identical to those in FIG. 10 with the exception that the actuation of the brakes of the vehicle is initiated by the park latch controller 136 as no EBS controller exists. The park demand signal causes the park latch controller to energise an electro-pneumatic relay 146, which acts to apply the brakes to either a maximum level or to a level set by the static model. Should the latter option be chosen, a feedback element would be required in the application control loop. In FIG. 11 the feedback element is shown as a load sensor (L) located in the end of the op-shaft 103. In FIG. 12, the feedback element is shows as a displacement transducer D, associated with a moving member of the brake for detecting the actuated travel of the brake. Operation of the park latch in a system having feedback is substantially identical to that of the EBS equipped vehicle.

FIGS. 16 to 20 illustrate in more detail possible ways of generating feedback signal representative of the park load level.

Figure 18:
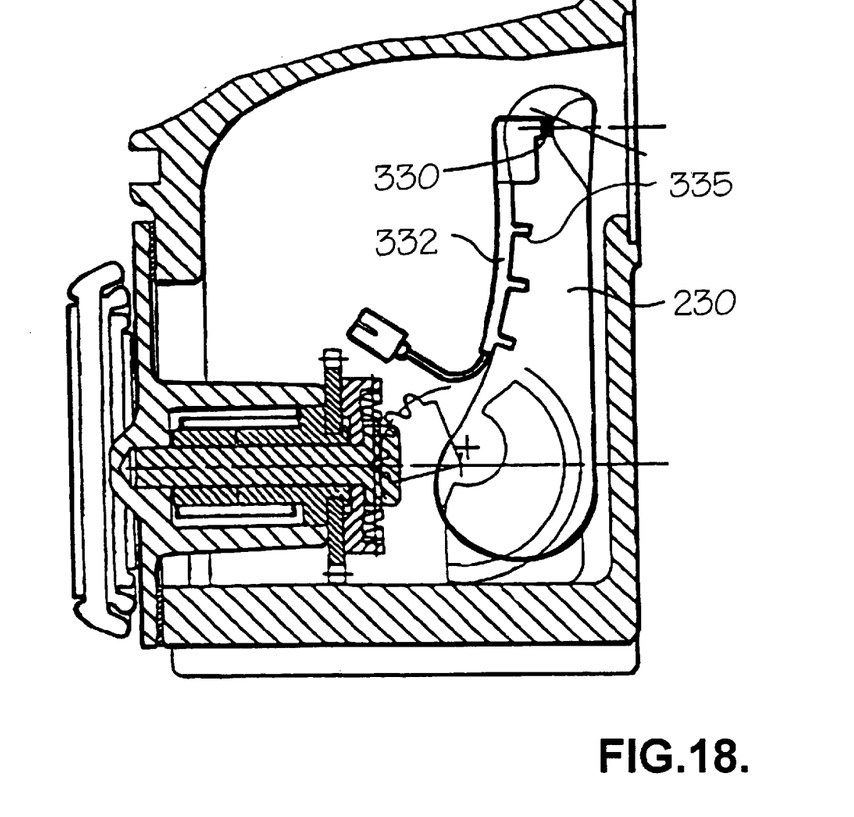
FIG. 18 is a sectional view showing the lever part of an op-shaft of a brake and associated wiring loom assembly.

Referring to FIG. 18, the op-shaft of the brake device includes the lever part 230 extending out of the brake device housing (not shown in FIG. 18). A load detection sensor 330 is located on the outer end of the lever part 230, ie. at the load input end, at the actuation interface with the load actuator, for example the piston of an air cylinder. The sensor 330 is adapted to measure the applied load and, through a cable connection loom 332 provides a signal to the ECU that is used to assess load and running clearances. The use of a switch/sensor 330 on the extended end of the op-shaft reduces the level of lost motion that is introduced into the system. The large velocity ratio between the actuator input end and op-shaft movement at the brake end is typically 20-1.

Figure 16:
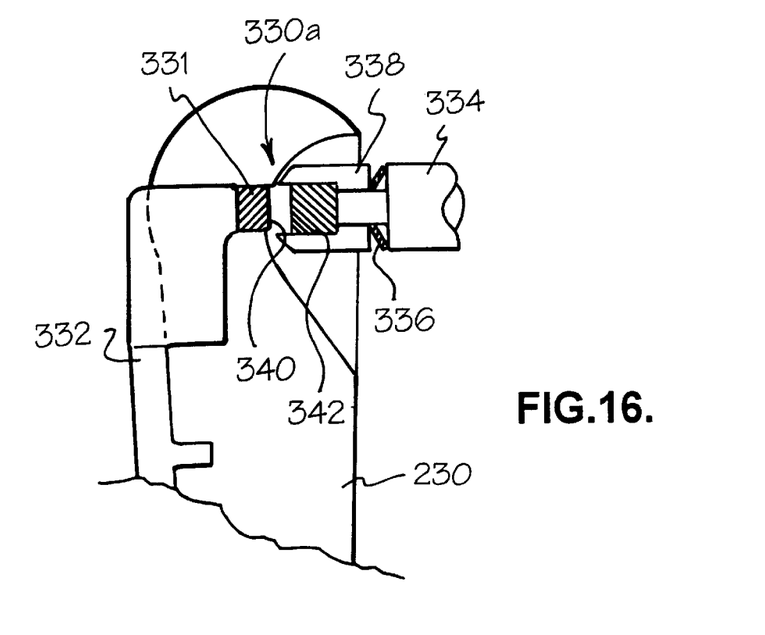
FIGS. 16 and 17 illustrate first and second embodiments of load detection arrangement in accordance with the present invention.
Figure 17:
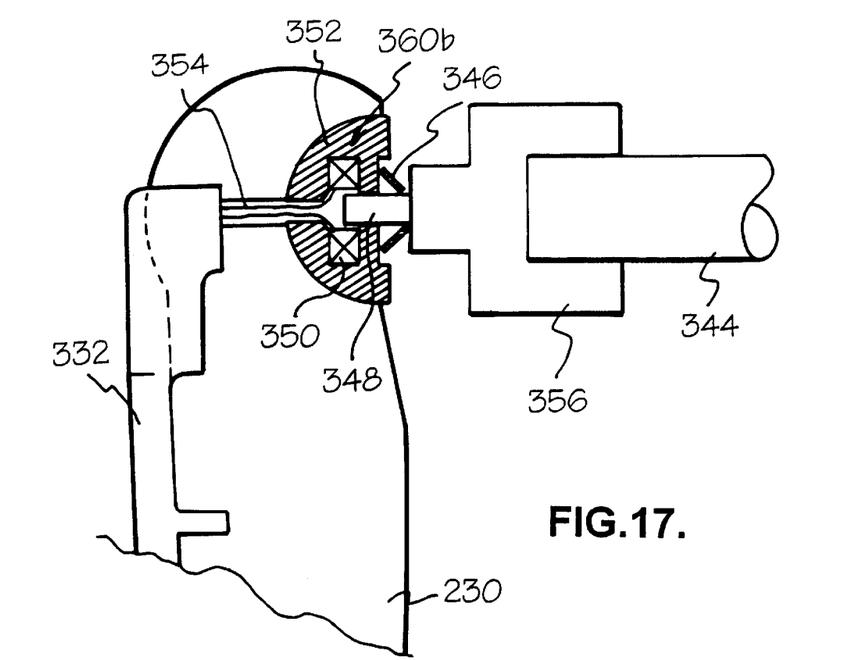

Two different types of switch/sensor 330 are shown, by way of example, in FIGS. 16 and 17.

The sensor 330a of FIG. 16 is in the form of a Hall effect sensor to detect the load condition. The load applied by an actuation rod 334 (for example from an air cylinder) reacts against a Belleville washer 336 which is sandwiched between the input rod 334 and a collar 338 acting against an arcuate surface 340 of the extended portion of the op-shaft lever part 230. The collar 338 also locates a magnet portion 342 of the sensor, a detector part of the sensor being located within the lever part 230, adjacent the arcuate surface 340. The detector part is coupled to wiring of the loom 332. The Belleville washer 336 enables a small movement of the magnet relative to the detector dependent on load which can be detected by the Hall effect to provide a proportional signal representative of load level.

The sensor 330b of FIG. 17 is in the form of a linear displacement sensor for proportional load measurement. An actuation rod 344 reacts against a Belleville washer 346 to provide proportional load movement of an axially extending soft iron finger 348. The finger 348 extends into a coil 350 to detect linear displacement. Both the Belleville washer 346 and coil 350 are positioned in a spherical knuckle 352 to allow sliding movement between the knuckle 352 and op-arm 230 during the actuation movement. Leads 354 from the coil 350 exit through a hole to the rear of the op-arm and connect to a loom 332 directed to the ECU.

In both FIG. 16 and FIG. 17 arrangements, the actuation rod 334, 346 can be attached directly to the sensor or, as shown in FIG. 17, via an attachment 356 secured to the actuation rod.

Figures 19, 20:
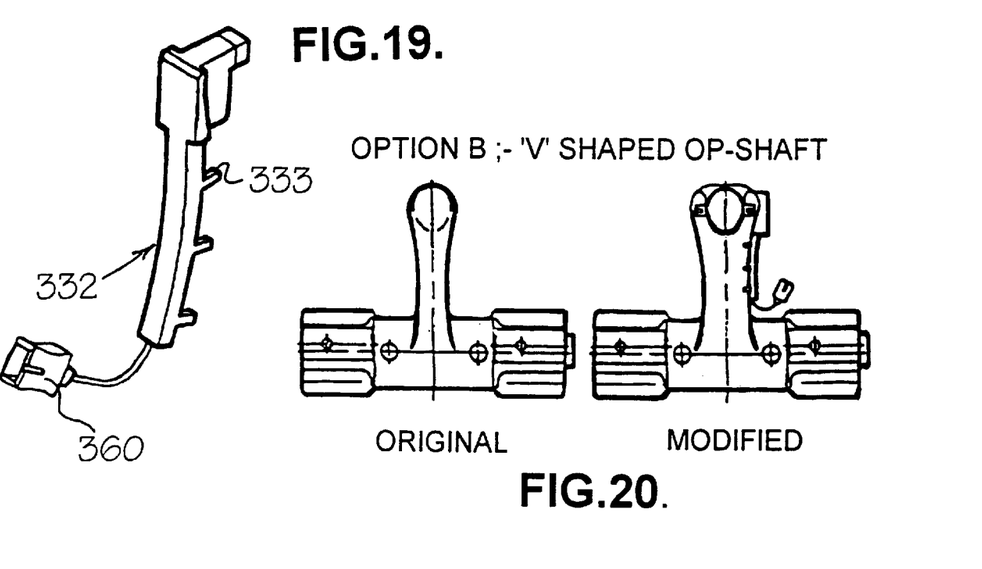
FIG. 19 shows in more detail the embodiment of wiring loom assembly shown in FIG. 18.
FIG. 20 illustrates two different op-shaft structures.

FIG. 19 shows a wiring loom arrangement 332 consisting of a moulded plastic connection which clips on to the op-arm by way of extending arms which conveniently lock into associated recesses on the arm or grip over appropriately located ridges. The loom has a connector 360 that can be connected direct to the ECU or to a suitable local connection associated with the ECU.

Figure 15:
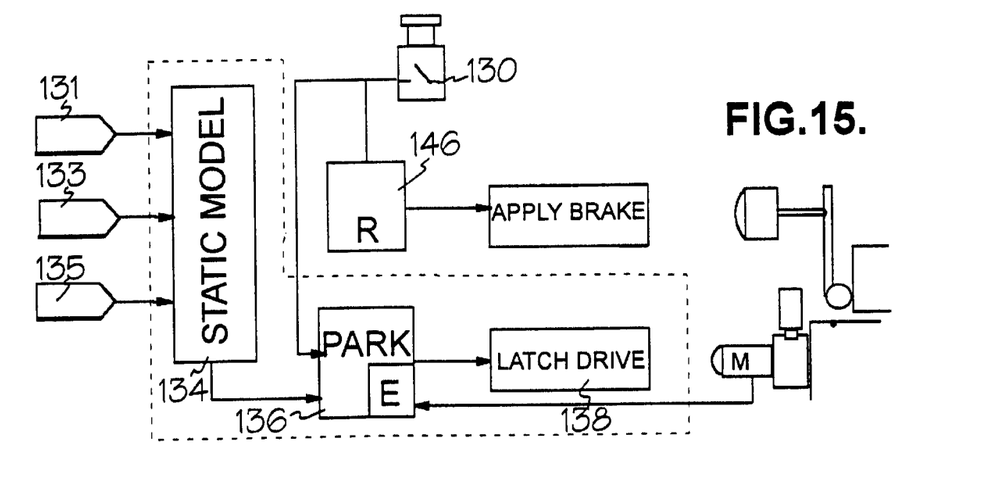
FIG. 15 is a block system diagram similar to FIG. 10 but which does not have provision for load feedback to be generated.

In the conventionally actuated system described above, not having any actuator feedback as shown in FIG. 15, the park latch controller causes the relay to apply the brakes to a safe level in excess of the maximum park load that would normally be required. The park latch controller then causes the latch drive to move the wedge into an advanced position. The position is set so as to hold the op-shaft in the appropriate park load condition upon release of the brake actuator. The position is determined by relating the static compensation value against the motor position in, for example, a look-up table. Thus, for a given park load, the wedge would have to be positioned in a specific position, controlled in accordance with the correlation between motor position and static compensation value. Release of the park latch in accordance with the example of FIG. 15 is substantially in accordance with that the earlier described embodiments.

What is claimed is:

1. A parking braking system for a brake in a vehicle wherein, upon moving a parking brake selector to a park position, the brake is arranged to be mechanically locked or latched into place by means of a variable position park latch mechanism which is adapted to co-operate with an operating member of the brake so as to set the park load on the brake at a desired level, characterized by a control system having a brake level determining means to determine the brake load level at which the brake is to be parked and a control means for controlling the actuation of the latching mechanism, or a combination of latching mechanisms, to selectively maintain that brake load during a parking phase wherein, in order to determine the park load level to which the brake should be applied in a given situation, there is provided a static model which generates a signal representative of the static condition of the vehicle or a static compensation signal wherein the static model is arranged to derive the static compensation signal through assessment of the stationary condition of the vehicle wherein the assessment of the stationary condition of the vehicle is arranged to be made by at least one vehicle sensor and wherein said measurements include any of a brake temperature signal indicative of the brake temperature at the time of park demand, a gradient sensor signal proportional to the gradient upon which the vehicle is being parked, and an axle load sensor signal providing information about the laden condition of the vehicle, the brake temperature being derived through assessment of the change in brake actuator travel during brake application.

2. A parking braking system for a brake in a vehicle wherein, upon moving a parking brake selector to a park position, the brake is arranged to be mechanically locked or latched into place by means of a variable position park latch mechanism which is adapted to co-operate with an operating member of the brake so as to set the park load on the brake at a desired level, characterized by a control system having a brake level determining means to determine the brake load level at which the brake is to be parked and a control means for controlling the actuation of the latching mechanism, or a combination of latching mechanisms, to selectively maintain that brake load during a parking phase wherein, in order to determine the park load level to which the brake should be applied in a given situation, there is provided a static model which generates a signal representative of the static condition of the vehicle or a state compensation signal wherein the parking load level requirement signal is generated for a given correlation between axle load and operating gradient and wherein the parking load level requirement signal derived from the correlation between axle load and operating gradient is also adjusted to take account of the relaxation of the brake as it cools.

3. A parking braking system as claimed in claim 2, wherein the static model takes the form of a series of information tables in a non-volatile memory within or coupled to said control means for controlling the actuation of the latching mechanism.

4. A parking braking system for a brake in a vehicle wherein, upon moving a parking brake selector to a park position, the brake is arranged to be mechanically locked or latched into place by means of a variable position park latch mechanism which is adapted to co-operate with an operating member of the brake so as to set the park load on the brake at a desired level, characterized by a control system having a brake level determining means to determine the brake load level at which the brake is to be parked and a control means for controlling the actuation of the latching mechanism, or a combination of latching mechanisms, to selectively maintain that brake load during a parking phase wherein the brake temperature at the commencement of park is used to introduce a proportional offset to the derived parking load level, the modified value deduced from this comparison being used to produce the static compensation signal that is used for setting the level to which the brake is actuated prior to the park latch being applied.

* * * * *

UNITED STATES PATENT AND TRADEMARK OFFICE
CERTIFICATE OF CORRECTION

PATENT NO. : 6,382,741 B1
DATED : May 7, 2002
INVENTOR(S) : McCann et al.

It is certified that error appears in the above-identified patent and that said Letters Patent is hereby corrected as shown below:

<u>Column 10,</u>
Line 30, "state" should be -- static --

Signed and Sealed this

Tenth Day of December, 2002

JAMES E. ROGAN
*Director of the United States Patent and Trademark Office*